E. E. STACY.
IMPLEMENT FOR OPENING BOXES.
APPLICATION FILED SEPT. 9, 1913.
1,110,969.
Patented Sept. 15, 1914.
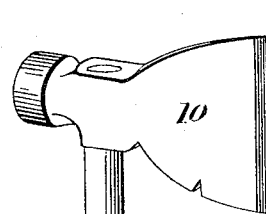
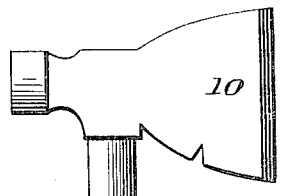
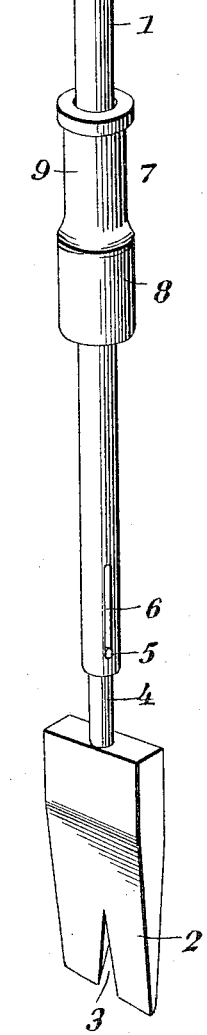
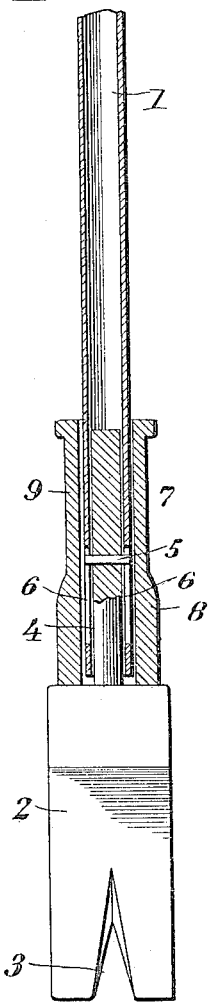
Inventor
E. E. Stacy
By Victor J. Evans
Attorney
Witnesses
M. F. Gannett
D. W. Gould.

UNITED STATES PATENT OFFICE.

EDWARD E. STACY, OF ONAWA, IOWA.

IMPLEMENT FOR OPENING BOXES.

1,110,969. Specification of Letters Patent. Patented Sept. 15, 1914.

Application filed September 9, 1913. Serial No. 788,902.

*To all whom it may concern:*

Be it known that I, EDWARD E. STACY, a citizen of the United States, residing at Onawa, in the county of Monona and State of Iowa, have invented new and useful Improvements in Implements for Opening Boxes, of which the following is a specification.

The invention relates to an implement designed primarily for use in opening boxes, serving also as a nail puller, staple puller, and having a head formed to provide a hatchet.

The main object of the present invention is the provision of an implement of the character described, in which the parts are arranged for certainty of operation and with a maximum effect with a minimum effort.

The invention in its preferred form of details will be described in the following specification, reference being had particularly to the accompanying drawings, in which:—

Figure 1 is a perspective view of the improved implement. Fig. 2 is a longitudinal central section of the same.

Referring particularly to the accompanying drawings, the improved implement comprises what may be termed a handle 1 including a suitable length of hollow construction. The tool proper comprises a wedge shaped blade 2 having a V-shaped notch 3 in its forward or operating edge, from which blade there is extended a stem 4 adapted to slidably fit within the handle 1, a pin 5 passed transversely through the stem being terminally seated in diametrically opposed slots 6 in the handle 1 to permit a limited play of the tool with respect to the handle.

Slidably encircling the handle member 1 is a driving member 7, also in the form of a sleeve having a comparatively enlarged terminal 8 and a reduced handle portion 9. The driving member is freely slidable longitudinally of the handle and is designed in operation to impart a blow to the edges of the blade projecting beyond the handle member whereby said blade or rather the operating edge thereof, is forced to its work.

The driving member is operated by hand and is, as will be obvious, rapidly reciprocated longitudinally of the handle to force the blade to a working position. The upper end of the handle member is provided with a head 10 preferably in the form of a hatchet, the head being provided with a stem adapted to fit within the handle member and be secured therein in any appropriate way.

The various parts of the implement are to be constructed of substantial metal and of such relative size as will best adapt them for the particular work for which the tool is designed, it being obvious that by reason of the wedge shaped tool blade the implement may be used to force the cover from the box or the like, while the V-shaped recess in the edge of the blade may be used to pull nails, staples or the like. The handle member 1 serves as a convenient handle for the hatchet head, so that the latter may be used for any and all of its usual purposes.

What is claimed is:—

An implement of the class described comprising a hollow handle bar, a tool having a wedge shaped blade and a stem, the latter being slidably mounted within the hollow handle, a pin carried by the stem and having a length coextensive with the maximum diameter of the handle member, the projecting ends of the pin beyond the stem being mounted in diametrically opposed slots formed wholly within the length of the hollow handle member to permit a limited movement of the tool with respect to the hollow handle member in both directions, and a driving member slidably mounted upon the hollow handle member and having an enlarged terminal portion to coöperate with the wedge shaped blade.

In testimony whereof I affix my signature in presence of two witnesses.

EDWARD E. STACY.

Witnesses:
O. P. EGLI,
H. L. MORRISON.